United States Patent
Corrêa et al.

(10) Patent No.: US 10,183,751 B2
(45) Date of Patent: Jan. 22, 2019

(54) SIDE-FACING BELTED AIRCRAFT SEATS

(71) Applicant: EMBRAER S.A., São José dos Campos-SP (BR)

(72) Inventors: Luis Gustavo D'Andrea Demétrio Corrêa, São Jose dos Campos-SP (BR); Viviane Cavalcante de Mello Matos, São Jose dos Campos-SP (BR); Beenal Gharia, São Jose dos Campos-SP (BR); Carlos Henrique Belloni Mourão, São Jose dos Campos-SP (BR); Divanir Fernando Neves Fernandes Gonçalves Pires, São Jose dos Campos-SP (BR); Oliver Turci de Camargo, São Jose dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 289 days.

(21) Appl. No.: 15/258,115

(22) Filed: Sep. 7, 2016

(65) Prior Publication Data
US 2018/0065751 A1 Mar. 8, 2018

(51) Int. Cl.
*B64D 11/06* (2006.01)
*B64D 11/02* (2006.01)
*B64D 45/00* (2006.01)

(52) U.S. Cl.
CPC ......... *B64D 11/0601* (2014.12); *B64D 11/02* (2013.01); *B64D 11/062* (2014.12); *B64D 11/0646* (2014.12); *B64D 2045/007* (2013.01)

(58) Field of Classification Search
CPC ............ B64D 11/0601; B64D 11/0646; B64D 11/062; B64D 11/02; B64D 2045/007
See application file for complete search history.

(56) References Cited

U.S. PATENT DOCUMENTS

| | | | |
|---|---|---|---|
| 8,033,502 B2 | 10/2011 | de Siqueira | |
| 8,939,465 B2 | 1/2015 | Kastelic et al. | |
| 2012/0259586 A1* | 10/2012 | Shields | G05B 23/0256 702/183 |
| 2015/0048205 A1* | 2/2015 | Seibt | B64D 11/02 244/118.5 |
| 2017/0259704 A1* | 9/2017 | Madaras | B60N 2/0276 |

* cited by examiner

Primary Examiner — Valentina Xavier
(74) Attorney, Agent, or Firm — Nixon & Vanderhye P.C.

(57) ABSTRACT

Side-facing belted aircraft seats include a tactile signaling unit to induce movement of the seat occupant. For such purpose, the signaling unit may be provided with a signaling lid covering a female buckle of a lap belt restraint assembly. The signaling lid is moveable between a closed position wherein engagement of a male tab of the lap belt with the female buckle is precluded and an open position wherein engagement of the male tab with the female buckle is allowed. The signaling lid thereby provides tactile stimulation when in the open position thereof to induce the seated occupant to shift on the cushioned seat so that a midsaggital plane of the occupant is aligned with an offset plane of the seat that is offset by a predetermined distance toward one side of the seat relative to a midplane of the seat.

16 Claims, 10 Drawing Sheets

SIDE-FACING BELTED AIRCRAFT SEATS

FIELD

The embodiments disclosed herein relate generally to side-facing belted aircraft seats. In some embodiments, a side-facing convertible belted aircraft seat is provided (e.g., a convertible belted aircraft toilet seat) which has a tactile signaling unit to encourage the seated occupant to shift physically on the cushioned seat in a direction towards the forward portion of the aircraft and against upright adjacent restraint structures (e.g., an arm rest of the seat, an adjacent bulkhead wall, or the like).

BACKGROUND

Aircraft seats that are occupied during certain phases of aircraft operation, e.g., taxi, take-off, climb, descent, and/or turbulence encounters, must be provided with an occupant restraint system. Aircraft occupant seat restraint systems will typically include a lap belt assembly comprised of a pair of opposing lap belt sections, one having a female buckle provided on its terminal end and the other having a belt length-adjustable male tab assembly at its terminal end which is capable of being cooperatively received in and released from the female buckle. Such conventional aircraft occupant seat restraint systems are satisfactory for forward or rearward facing aircraft seats that are oriented generally in alignment with the aircraft's flight direction (e.g., parallel to the aircraft's longitudinal axis) since the conventional lap belt assembly restrains the occupant symmetrically relative to the centerline of the aircraft seat (i.e., the midsagittal plane of an occupant's body is symmetrically aligned with the positional centerline of the seat). Such symmetrical midsagittal positioning of the occupant on the aircraft seat thereby ensures that the lap belt assembly will provide maximum occupant restraint due to the longitudinal forces aligned with the direction of aircraft movement that are typically encountered.

Side-facing aircraft seats, i.e., seats where the seat causes the midsagittal plane of the occupant to be substantially perpendicular to the aircraft's longitudinal axis, present certain problems with respect to occupant safety. For example, conventional lap belt systems are typically less effective when the occupant is side-facing rather than forward or rearward facing. One example of a side-facing aircraft seat that may be occupied during all phases of aircraft operation is a convertible belted toilet seat, i.e., an aircraft monument whereby a passenger seat is provided as a removable cover for an on-board toilet. Convertible belted toilet seats may thus be employed in some aircraft interior configurations, especially business-class aircraft, so as to increase the maximum aircraft occupancy (i.e., since the belted toilet seat can accommodate an additional occupant during all phases of aircraft operation) while still providing an on-board toilet facility for all occupants.

One prior proposal to provide occupant restraint systems for side-facing aircraft seats is apparent in U.S. Pat. No. 8,939,465, the entire content of which is expressly incorporated hereinto by reference. According to the proposal in such patent, the occupant's midsaggital plane is aligned substantially coincident with the seat's positional centerline. The side-facing seat has a conventional lap belt restraint system that may be supplemented with a shoulder belt. Additional supplemental occupant restraint is also provided according to such prior proposal by means of an inflatable airbag assembly on the side of the occupant toward the front of the aircraft.

SUMMARY

The embodiments disclosed herein relate to side-facing belted aircraft seats which provide enhanced occupant restraint and to aircraft which include the same. More specifically, side-facing belted aircraft seats are provided with a seat belt assembly comprising a length-adjustable seat belt portion which is capable of encircling a lap region of the seated occupant, and a signaling unit which houses a part of the seat belt assembly and which provides tactile stimulation to the seated occupant to thereby induce the seated occupant to shift on the cushioned seat so that a midsagittal plane of the occupant is aligned with an offset plane of the seat that is offset by a predetermined distance toward one side of the seat relative to a midplane of the seat.

One specific embodiment of a side-facing belted aircraft seat includes a length-adjustable seat belt portion having a male tab at a terminal end thereof, and a female buckle for removable engagement with the male tab. According to such embodiment, the signaling unit houses the female buckle and is provided with a signaling lid to cover the female buckle. The signaling lid is moveable between a closed position wherein engagement of the male tab with the female buckle is precluded and an open position wherein engagement of the male tab with the female buckle is allowed. The signaling lid thereby provides the tactile stimulation when in the open position to induce the seated occupant to shift on the cushioned seat so that the midsaggital plane of the occupant is aligned with the offset plane of the seat.

The signaling lid may include a hinge at a forward edge thereof to allow the signaling lid to be pivotally moved between the closed and opened conditions. A finger strap may alternatively or additionally be provided on the signaling lid to allow manual manipulation of the lid so as to facilitate movement thereof between the closed and opened conditions thereof.

The signaling lid may include a side cut-out which visibly exposes a portion of the female buckle housed in the signaling unit. If present, the cut-out portion is sized so as to prevent the male tab from being engaged with the female buckle while the signaling lid is in the closed position thereof.

An elongated buckle cushion may be provided adjacent to the signaling along a back edge region of the cushioned seat.

The side-belted aircraft seat may comprise right and left arm rests, such that the offset plane is offset by a predetermined distance toward one of the arm rests that is in a travel direction of the aircraft.

The side-facing belted aircraft seat may especially be embodied in a convertible side-facing aircraft toilet seat comprised of a toilet seat that is covered by the cushioned seat, wherein the cushioned seat is movable so as to expose the toilet seat therebelow for use.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
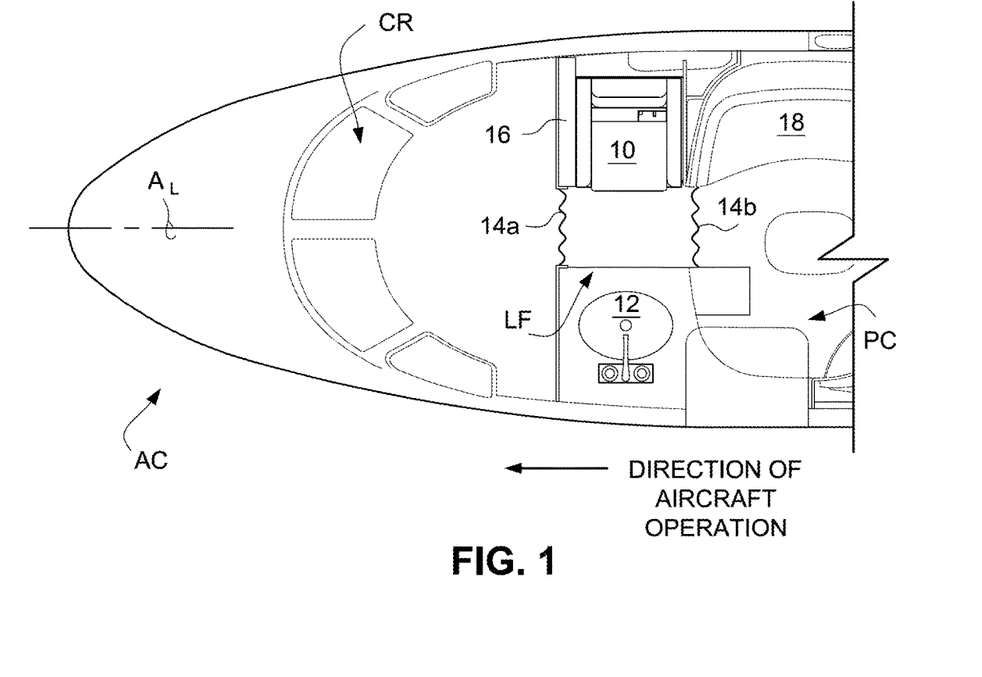
FIG. 1 is an x-ray plan view of a forward portion of an aircraft which includes a side-facing belted toilet seat in accordance with an embodiment of the herein disclosed invention.

Accompanying FIG. 1 depicts the forward portion of an aircraft AC including the cockpit region CR and a forward exemplary layout of the passenger cabin PC. Also depicted in FIG. 1 is a lavatory facility LF that includes a side-facing belted convertible toilet seat 10 to be described in greater detail below and a sink/faucet monument 12. That is the toilet seat 10 faces the longitudinal axis $A_L$ of the aircraft AC. The lavatory facility LF may be screened for privacy from the cockpit region CR and the passenger cabin PC by moveable screens or doors 14a, 14b. The convertible toilet seat 10 is preferably positioned against a bulkhead wall 16 toward the forward portion of the aircraft. As depicted in FIG. 1, the passenger cabin PC may include a side facing divan 18 which may also benefit from the present invention.

The side-facing belted toilet seat 10 that may be employed in the lavatory facility LF and which embodies the present invention is depicted in greater detail in FIGS. 1-4. As shown, the seat 10 includes a seat base 20 and upright back portion 22, right and left arm rests 24a, 24b, respectively, and a cushioned seat 26. The cushioned seat 26 is conventionally hinged at its rear end so as to be pivotally moveable into a raised position to allow access to the toilet seat 28 otherwise hidden therebelow.

Figure 2:
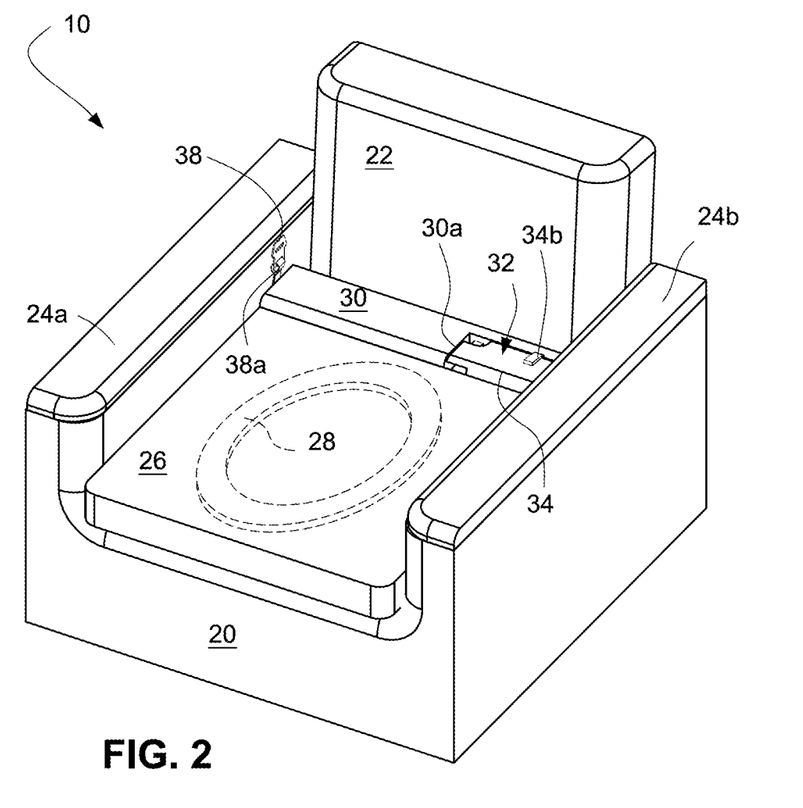
FIG. 2 is a left front perspective view of the side-facing belted toilet seat shown in FIG. 1.
Figure 3:
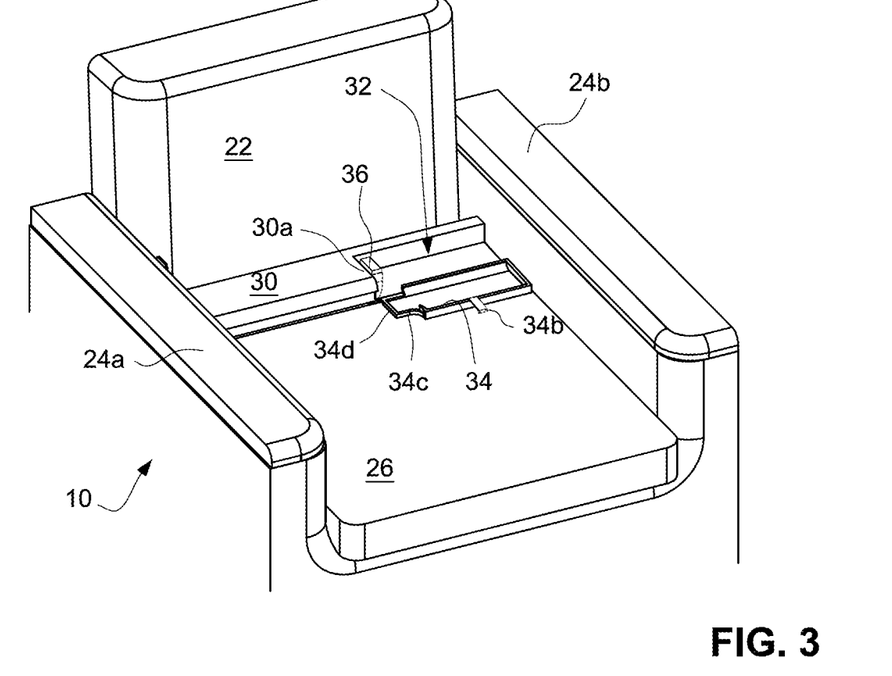
FIG. 3 is a right front perspective view of the side-facing belted toilet seat shown in FIG. 2 with the signaling lid thereof in an open position to expose a fixed-position female buckle assembly.

An elongated buckle cushion 30 is provided along a portion of the rearward edge region of the seat cushion. As shown, the elongated buckle cushion 30 extends transversely from the right arm rest 24a and includes a lateral recess 30a near the left arm rest 24b. Signaling unit 32 is provided substantially coextensive with the buckle cushion 30 and thus occupies the lateral recess 30a defined thereby. The signaling unit 32 includes a signaling lid 34 that may be hinged along its forward edge by an elongated hinge element 34a (see FIGS. 5 and 6) so as to be pivotally movable between a closed position as shown in FIG. 2 and into an open position as shown in FIG. 3. The signaling unit houses a female buckle 36 so that when the signaling lid 34 is in the open position, the female buckle 36 will be exposed for use. As shown in FIG. 3, the signaling lid 34 will preferably be fully pivoted into an open position so as to be flush against a surface portion of the cushioned seat 26.

A conventional inertial reel lap belt assembly 38 which includes a lap belt 38a and a male tab 38b at a terminal end thereof may be housed within the interior structure of the right arm rest 24a or below the buckle cushion 30. Thus, when the signaling lid 34 is in the open position so as to fully expose the female buckle 36 housed thereby, the belt 38a may be extended around the waist of the occupant seated on the cushioned seat 26 so that the male tab 38a may be releasably engaged with the fixed position female buckle 36. Such an operational state is shown in FIG. 4.

Figure 4:
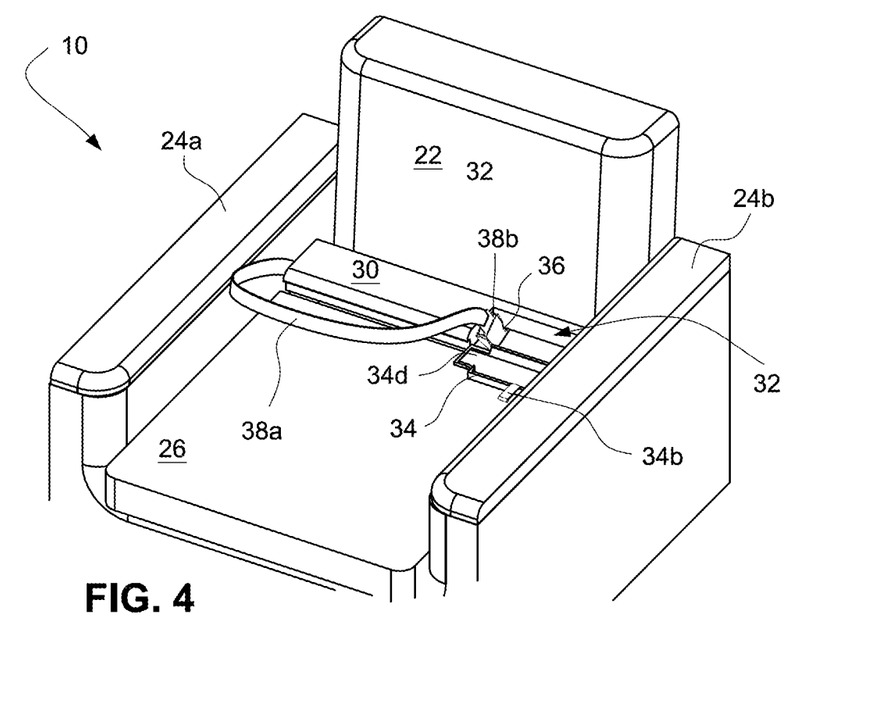
FIG. 4 is a partial left front perspective view of the side-facing belted toilet seat showing the male tab of a length-adjustable lap belt engaged with the buckle.
Figure 5:
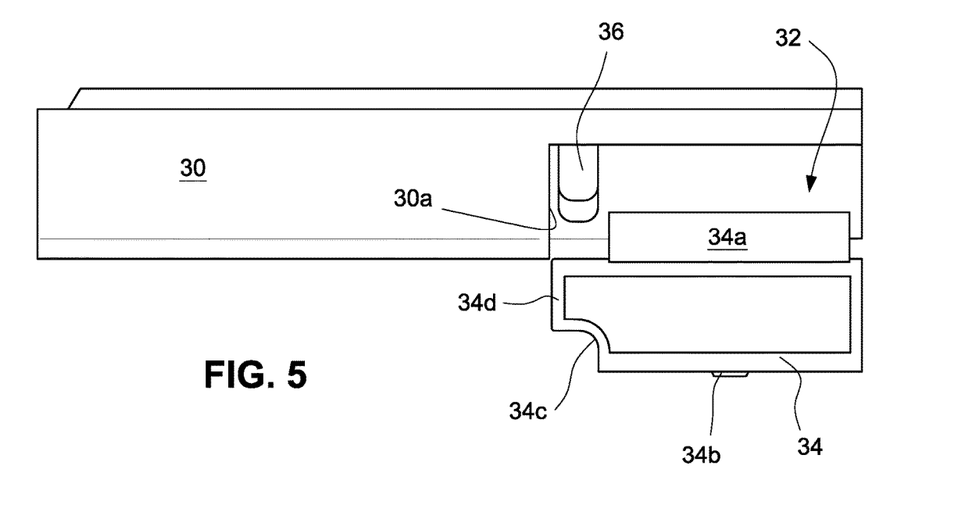
FIG. 5 is a top plan view of the signaling unit provided with the side-facing belted toilet seat showing the signaling lid thereof in an opened position to thereby operationally expose the female buckle housed therebelow.
Figure 6:
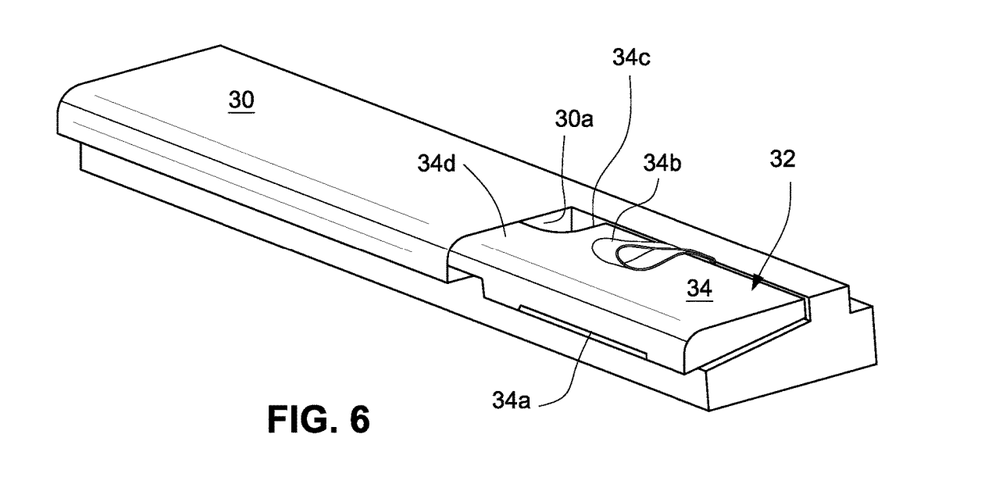
FIG. 6 is a perspective view of the signaling unit depicted in FIG. 5 showing the signaling lid in a closed position to thereby partially obstruct the female buckle housed therebelow.
Figure 7:
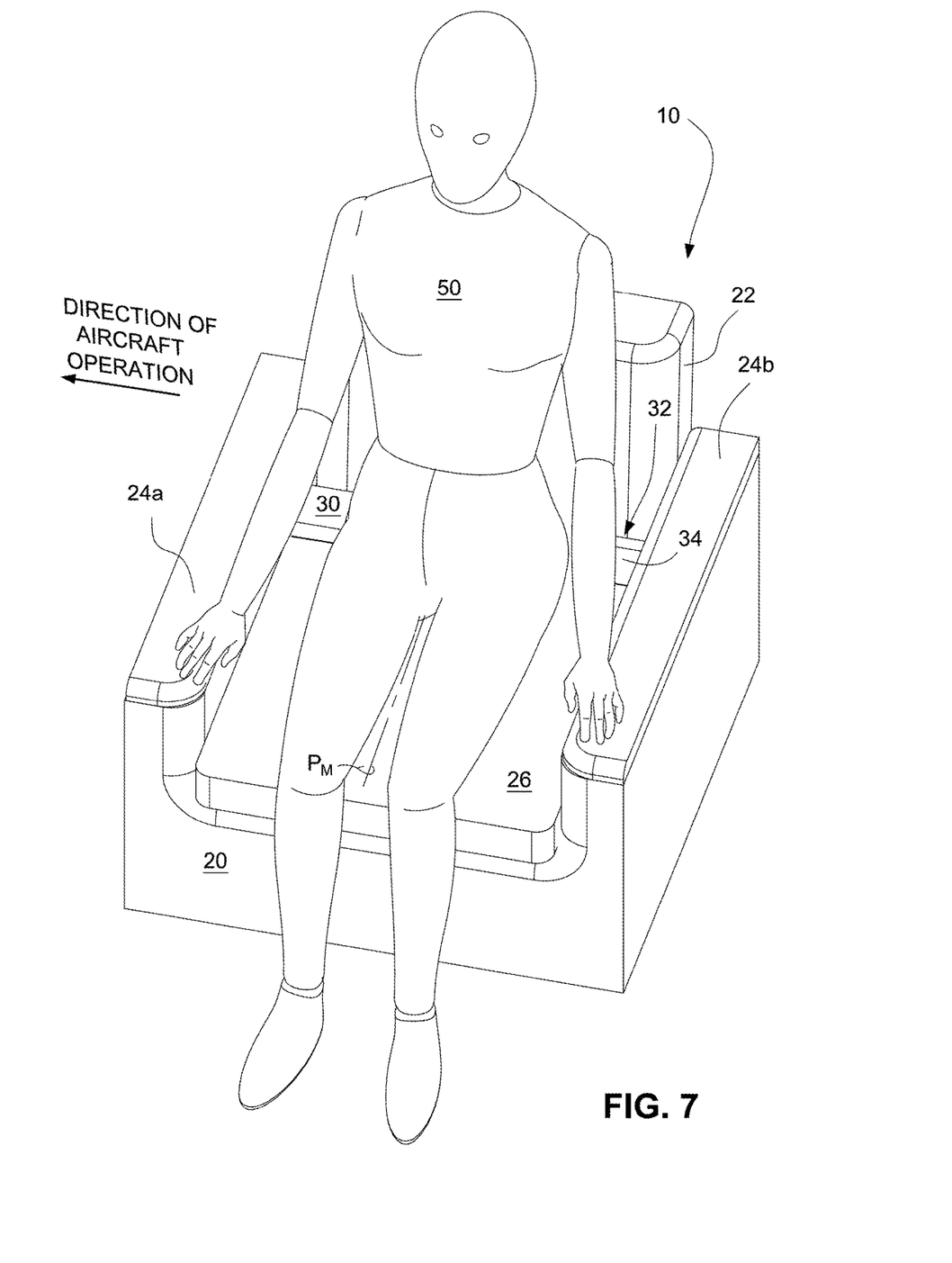
FIGS. 7-12 schematically depict in perspective view an operation sequence whereby an occupant is induced to sit on the belted toilet seat so the occupant's midsagittal plane is asymmetrically oriented (off-set) toward a forward portion of the aircraft relative to the positional centerline of the seat.

FIGS. 5 and 6 are enlarged plan and perspective views of the elongated buckle cushion 30 and the signaling unit 32 employed in the belted toilet seat 10 shown in FIGS. 2-4. As shown in FIG. 5, the signaling lid 34 has been pivoted into its open position so as to be substantially parallel to the top surface of the cushioned seat 26 with the female buckle 36 fully exposed whereas FIG. 6 shows the signaling lid 34 in a closed position. In order to assist the occupant, the signaling lid 34 may be provided with a finger pull strap 34b or the like to facilitate manual pivotal manipulation of the lid 34 between its open and closed positions. In addition, the lid 34 may be provided with a side cut-out portion 34c which is in sufficient alignment with the female buckle 36. The cut-out portion 34c is sized so as to be large enough to provide at least partial visual exposure of the female buckle 36 when an occupant is seated on the cushioned seat 26. A remaining side portion 34d adjacent to the cut-out portion 34c will, however, physically block the male tab 38b from engagement with the female buckle 36. Thus, engagement of the male tab 38b and the female buckle will only be physically possible when the signaling lid is in its opened position as shown in FIG. 5.

Figure 10:
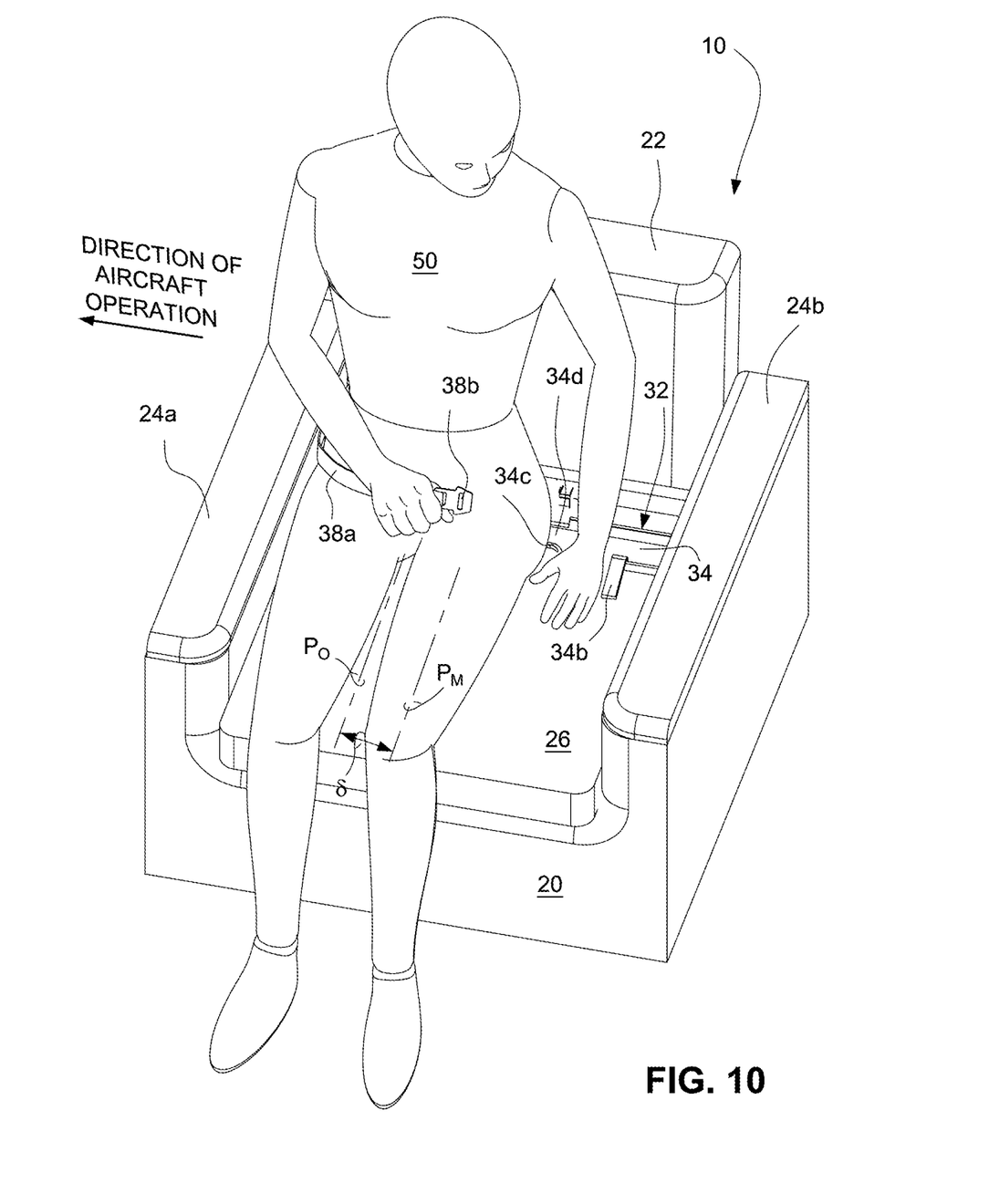
Figure 11:
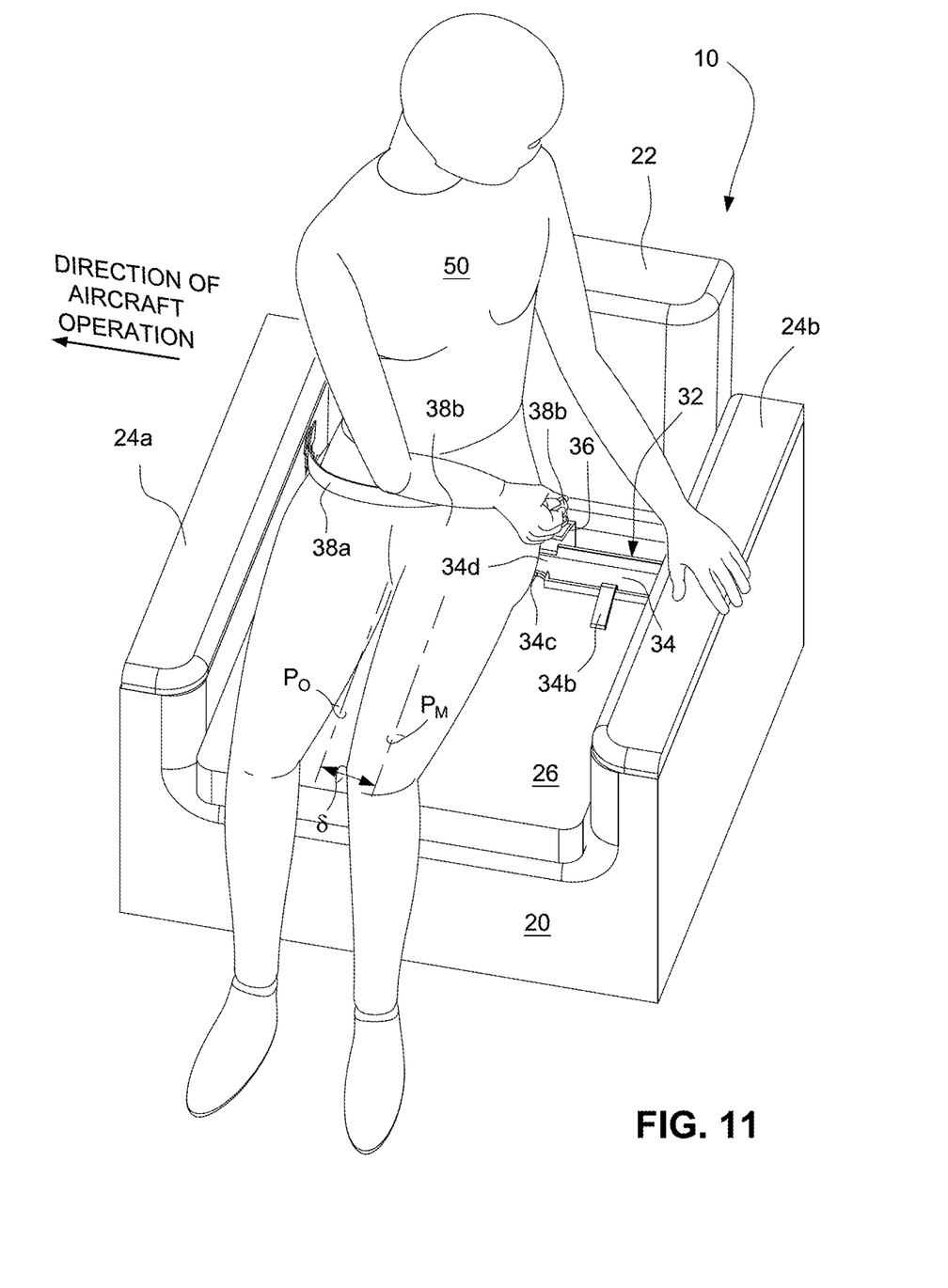

In use, an occupant 50 may be seated on the cushioned seat 26 in an unbelted state so as to be in a comfortable seating position. As depicted in FIG. 10, when in an unbelted seating positioned on the cushioned seat 26, the midsagittal plane of the occupant 50 is substantially aligned with the midplane $P_m$ of the seat 10. In such a position the midsagittal plane of the occupant 50 will be substantially perpendicular to the direction of aircraft operation (which is parallel to the longitudinal axis $A_L$ of the aircraft AC) since the seat 10 is side-facing (i.e., the seat 10 faces the longitudinal axis $A_L$ of the aircraft AC).

Figure 8:
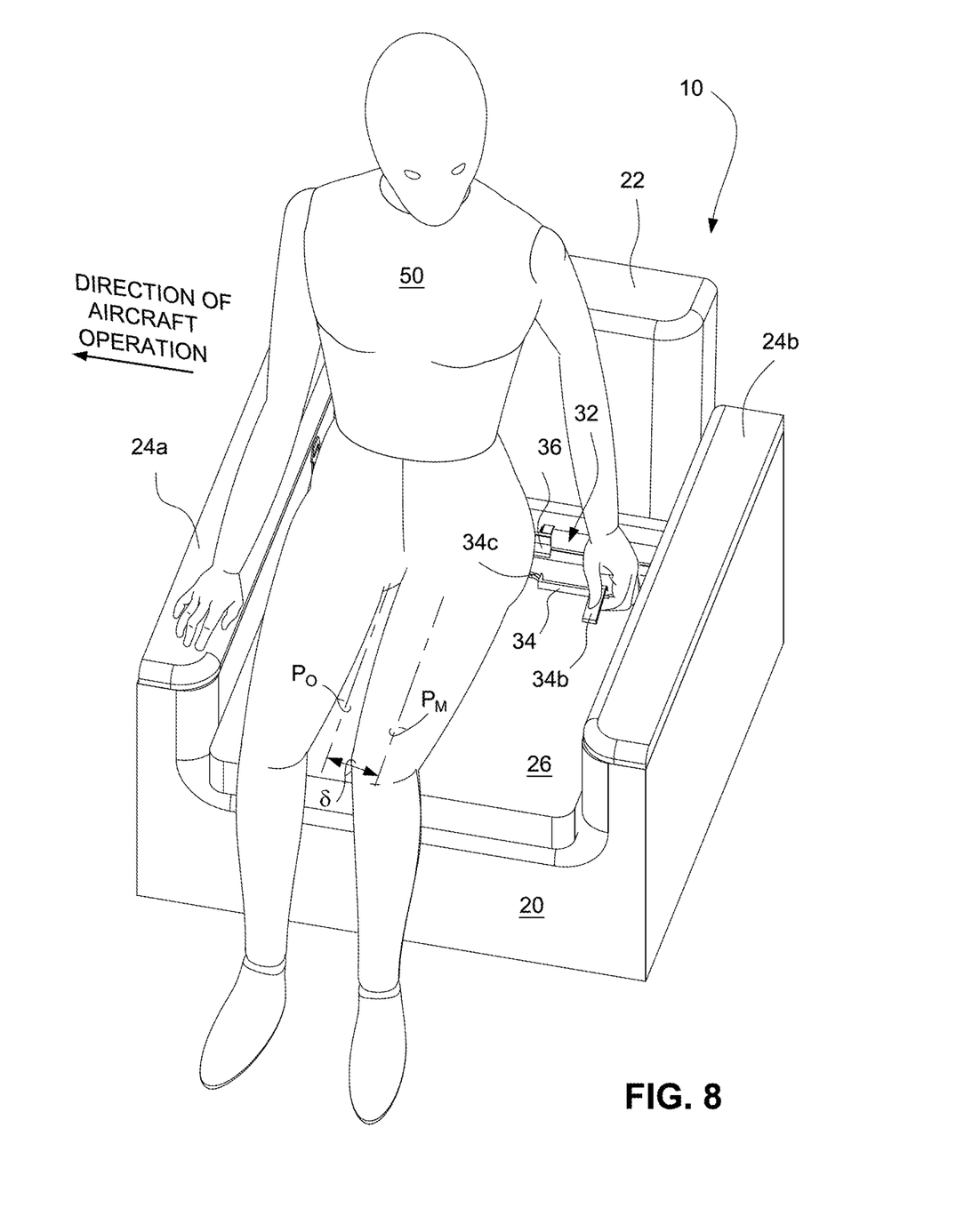
Figure 9:
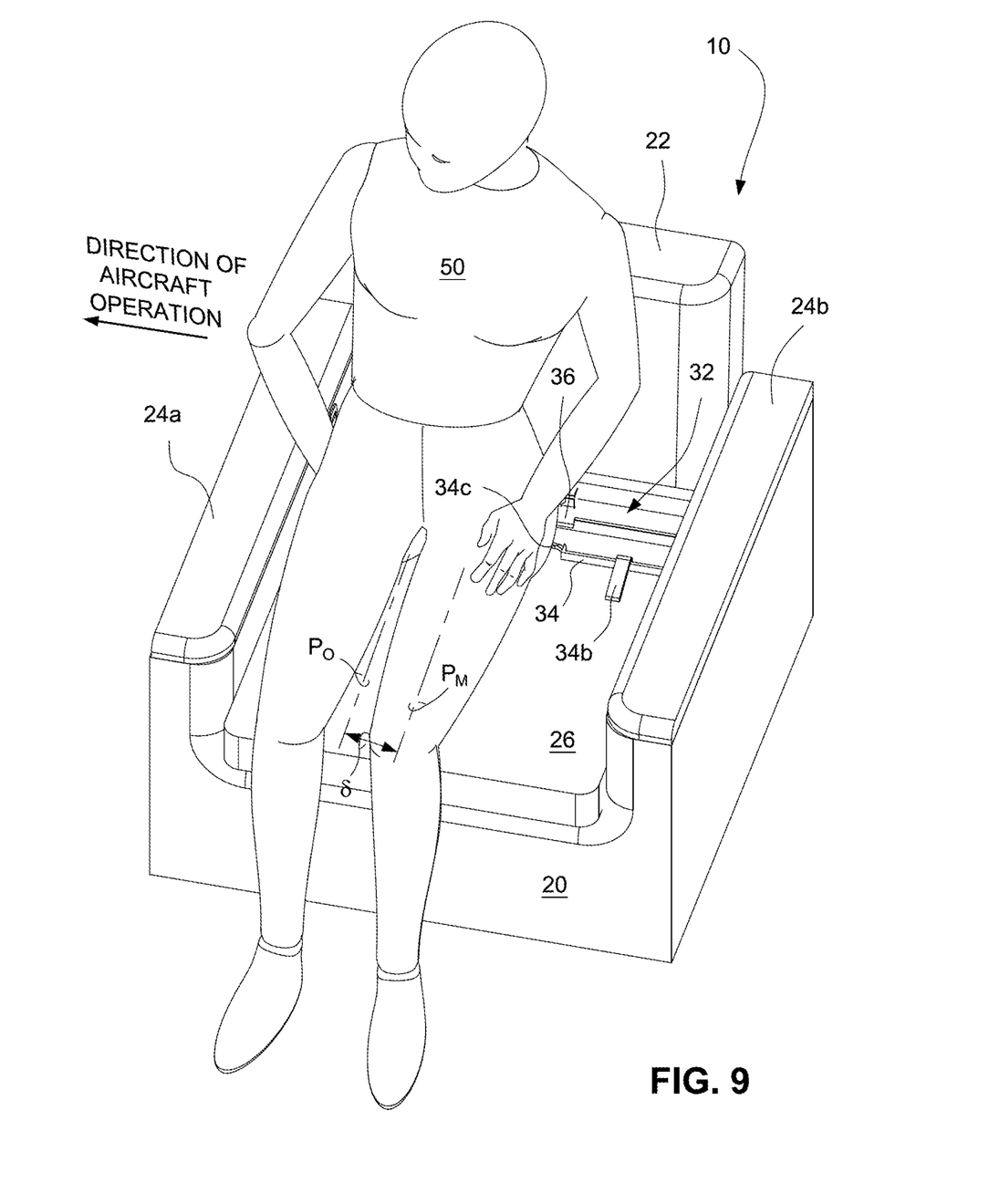

Should the occupant 50 need to be belted onto the cushioned seat 26 (e.g., during certain phases of aircraft operation, e.g., taxi, take-off, climb, descent, and/or turbulence encounters), the occupant will realize that the female buckle 36 is housed within the signaling unit 32. For example, the occupant 50 may visibly see a portion of the female buckle 36 through the side cut-out 34c when looking to insert the male tab 38a at the terminal end of the lap belt 38a. However, since the cut-out portion 34c of the signaling lid 34 precludes the male tab from being inserted into the female buckle 36, the occupant 50 will be encouraged to grasp the finger strap 34b so as to pivotally move the signaling lid 34 from its closed position and into its open position. In order to fully open the signaling lid 34, however, the occupant 50 will be induced to shift laterally on the cushioned seat 26 so that the midsagittal plane of the occupant is then substantially aligned with an offset plane $P_O$ that is parallel to the midplane $P_M$ but is displaced toward the forward portion of the aircraft AC (i.e., in the direction of aircraft operation) by an offset distance δ. Such a state is depicted in FIG. 8.

Thereafter, the occupant 50 may proceed to grasp the male tab 38b and extend the lap belt 38a sufficiently so as to allow the male tab 38b to be inserted and engaged by the female buckle 36 thereby causing the occupant 50 to be belted to the cushioned seat 26. Such an exemplary sequence is depicted in FIGS. 9-12.

Figure 12:
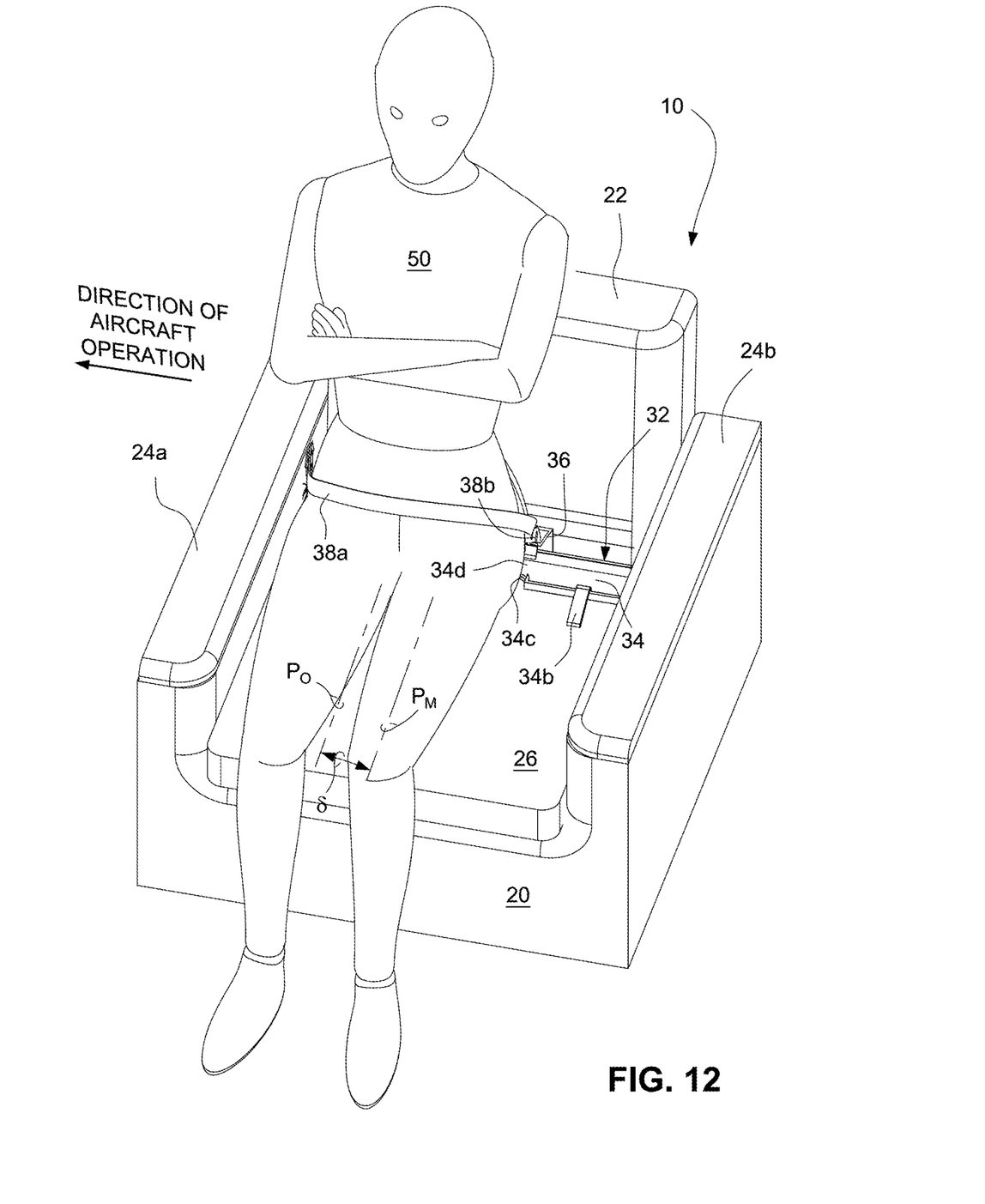

It will be observed from FIG. 12 that once the occupant 50 is belted onto the cushioned seat 26, the midsagittal plane of the occupant 50 will be maintained substantially in alignment with the offset plane $P_O$ so that the side of the occupant 50 (i.e., in the depiction of FIG. 12, the occupant's right side), will be positioned immediately adjacent the right arm rest 24a. Such a position will therefore provide increased side bracing and restraint for the occupant seated on the convertible toilet seat 10. In addition, should a bulkhead wall 16 be provided adjacent the right arm rest 24a, then the occupant 50 will be provided by an additional amount of side restraint structure. Moreover, since the material of the buckle cushion 30 is a relatively soft and resilient cushion material and the material forming the signaling lid 34 is formed of a rigid plastics or metal, the occupant will be provided with a tactile stimulation to move or shift on the cushioned seat 26 so as to be more comfortably engaged with the buckle cushion 30. This tactile stimulation coupled with the inability to fully open the signaling lid 34 if the passenger 50 remains seated substantially in alignment with the midplane $P_M$ will induce the passenger 50 to shift toward the offset plane $P_O$ and thereby be provided with increased structural restraint provided by the right arm rest 24a and/or the bulkhead wall 16 as discussed previously.

Although the invention has been described herein as being particularly embodied in a side-facing belted toilet seat, those in this art will recognize that the invention may likewise be embodied in other side-facing seating monuments, for example the side-facing divan 18 as shown in FIG. 1.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A side-facing belted aircraft seat comprising:
   a seat base which includes a cushioned seat for supporting a seated occupant thereon;
   a seat belt assembly comprising a length-adjustable seat belt portion which is capable of encircling a lap region of the seated occupant, and
   a signaling unit which houses a part of the seat belt assembly, wherein
   the signaling unit provides tactile stimulation to the seated occupant to thereby induce the seated occupant to shift on the cushioned seat so that a midsagittal plane of the occupant is aligned with an offset plane of the seat that is offset by a predetermined distance toward one side of the seat relative to a midplane of the seat.

2. The side-facing belted aircraft seat as in claim 1, wherein the length-adjustable seat belt portion includes a male tab at a terminal end thereof, and wherein the seat belt assembly includes a female buckle for removable engagement with the male tab which is housed within the signaling unit.

3. The side-facing belted aircraft seat as in claim 2, wherein the signaling unit includes a signaling lid covering the female buckle which is moveable between a closed position wherein engagement of the male tab with the female buckle is precluded and an open position wherein engagement of the male tab with the female buckle is allowed, and wherein the signaling lid provides tactile stimulation when in the open position to induce the seated occupant to shift on the cushioned seat so that the midsagittal plane of the occupant is aligned with the offset plane of the seat.

4. The side-facing belted aircraft seat as in claim 3, wherein the signaling lid includes a hinge to allow the signaling lid to be pivotally moved between the closed and opened conditions.

5. The side-facing belted aircraft seat as in claim 3, wherein the signaling lid comprises a finger strap to allow manual manipulation of the lid so as to facilitate movement thereof between the closed and opened conditions.

6. The side-facing belted aircraft seat as in claim 3, wherein the signaling lid comprises a side cut-out which visibly exposes a portion of the female buckle housed in the signaling unit.

7. The side-facing belted aircraft seat as in claim 6, wherein the cut-out portion is sized so as to prevent the male tab from being engaged with the female buckle while the signaling lid is in the closed position thereof.

8. The side-facing belted aircraft seat as in claim 1, which further comprises an elongated buckle cushion adjacent to the signaling unit along a back edge region of the cushioned seat.

9. The side-facing belted aircraft seat as in claim 1, wherein the seat is a convertible toilet seat, comprised of a toilet seat that is covered by the cushioned seat, wherein the cushioned seat is movable so as to expose the toilet seat therebelow for use.

10. The side-facing belted aircraft seat as in claim 1, wherein the seat comprises right and left arm rests, and wherein the offset plane is offset by a predetermined distance toward one of the arm rests that is in a travel direction of the aircraft.

11. The side-facing belted aircraft seat as in claim 8, wherein the buckle cushion is formed of a resilient cushion material and the signaling lid is formed of a rigid material so as to provide the tactile stimulation to the seated passenger to shift on the cushioned seat toward the offset plane.

12. An aircraft which comprises the side-facing belted aircraft seat as in claim 1.

13. A belted side-facing aircraft toilet seat comprising:
   a seat base which includes a cushioned seat for supporting a seated occupant thereon;
   a seat back;
   a toilet seat covered by the cushioned seat, wherein the cushioned seat is movable so as to allow access to the toilet seat;
   a seat belt assembly comprising a length-adjustable seat belt portion which is capable of encircling a lap region of the seated occupant and having a male tab at a terminal end thereof, and a female buckle for removable engagement with the male tab, and
   a signaling unit which houses the female buckle, wherein the signaling unit includes a signaling lid covering the female buckle which is moveable between a closed position wherein engagement of the male tab with the female buckle is precluded and an open position wherein engagement of the male tab with the female buckle is allowed, and wherein the signaling lid provides tactile stimulation when in the open position to induce the seated occupant to shift on the cushioned seat so that a midsagittal plane of the occupant is aligned with an offset plane of the seat that is offset by a predetermined distance toward one side of the seat relative to a midplane of the seat.

14. An aircraft which comprises the belted side-facing aircraft toilet seat according to claim 13.

15. An aircraft comprising a fuselage and belted passenger seats within a passenger compartment, wherein at least one of the belted passenger seats is a side-facing belted aircraft seat according to claim 1.

16. The aircraft as in claim 15, wherein the side-facing belted aircraft seat is a convertible toilet seat comprised of a toilet seat that is covered by the cushioned seat, wherein the cushioned seat is movable so as to expose the toilet seat therebelow for use.

\* \* \* \* \*